US012086931B2

(12) United States Patent
Miao et al.

(10) Patent No.: US 12,086,931 B2
(45) Date of Patent: Sep. 10, 2024

(54) METHODS OF 3D CLOTHED HUMAN RECONSTRUCTION AND ANIMATION FROM MONOCULAR IMAGE

(71) Applicant: TENCENT AMERICA LLC, Palo Alto, CA (US)

(72) Inventors: Dan Miao, Fremont, CA (US); Bing Jian, Cupertino, CA (US); Weiwei Feng, Mountain View, CA (US); Shan Liu, San Jose, CA (US); Ye Wang, New Castle, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 56 days.

(21) Appl. No.: 17/982,945

(22) Filed: Nov. 8, 2022

(65) Prior Publication Data

US 2023/0281921 A1 Sep. 7, 2023

Related U.S. Application Data

(60) Provisional application No. 63/315,377, filed on Mar. 1, 2022.

(51) Int. Cl.
*G06T 17/00* (2006.01)
*G06T 7/194* (2017.01)
(Continued)

(52) U.S. Cl.
CPC .............. *G06T 17/00* (2013.01); *G06T 7/194* (2017.01); *G06T 7/30* (2017.01); *G06T 7/40* (2013.01);
(Continued)

(58) Field of Classification Search
None
See application file for complete search history.

(56) References Cited

U.S. PATENT DOCUMENTS 8,629,871 B2 1/2014 O'Brien et al.
9,189,886 B2 11/2015 Black et al.
(Continued)

OTHER PUBLICATIONS

Saito, Shunsuke; Pifu: Pixel-aligned implicit function for high-resolution clothed human digitization; May 2019; pp. 2304-2314; https://openaccess.thecvf.com/content_ICCV_2019/papers/Saito_PIFu_Pixel-Aligned_Implicit_Function_for_High-Resolution_Clothed_Human_Digitization_ICCV_2019_paper.pdf (Year: 2019).*

(Continued)

*Primary Examiner* — Joni Hsu
(74) *Attorney, Agent, or Firm* — Sughrue Mion, PLLC (57) ABSTRACT

A method for 3D human model reconstruction and animation includes receiving a two-dimensional (2D) image of a human, segmenting the 2D image into a foreground with the human and a background without the human in the 2D image, generating a parametric model comprising a pose, a shape, and one or more rigging parameters based on the human in the foreground, predicting a textured three-dimensional (3D) model using implicit surface reconstruction of the human in the foreground, aligning the parametric model and the textured 3D model using a 3D registration, and generating a textured 3D clothed human model based on the aligned parametric model and the predicted textured 3D model.

20 Claims, 7 Drawing Sheets

(51) Int. Cl.
    *G06T 7/30*           (2017.01)
    *G06T 7/40*           (2017.01)
    *G06T 13/40*         (2011.01)
    *G06T 15/04*         (2011.01)
    *G06V 10/74*         (2022.01)

(52) U.S. Cl.
    CPC .............. *G06T 13/40* (2013.01); *G06T 15/04*
               (2013.01); *G06V 10/761* (2022.01); *G06T*
                                *2207/30196* (2013.01)

(56) References Cited

U.S. PATENT DOCUMENTS

| | | |
|---|---|---|
| 9,378,589 B2 | 6/2016 | Kim et al. |
| 10,762,597 B2 | 9/2020 | Izumi |
| 2010/0111370 A1 | 5/2010 | Black et al. |
| 2015/0206345 A1 | 7/2015 | Chang et al. |
| 2019/0251735 A1 | 8/2019 | Fleureau et al. |
| 2019/0392626 A1 | 12/2019 | Black et al. |
| 2021/0049802 A1* | 2/2021 | Luo ....................... G06T 19/006 |
| 2021/0049811 A1* | 2/2021 | Fedyukov ................ G06T 7/60 |
| 2021/0312686 A1 | 10/2021 | Lin et al. |
| 2022/0237879 A1* | 7/2022 | Wu ......................... G06T 15/04 |

OTHER PUBLICATIONS

International Search Report dated Feb. 28, 2023 in Application No. PCT/US2022/049510.
Written Opinion of the International Searching Authority dated Feb. 28, 2023 in Application No. PCT/US2022/049510.
Majithia et al., "Robust 3D Garment Digitization from Monocular 2D Images for 3D Virtual Try-On Systems", arxiv, <URL: https://araiv.org/abs/2111.15140 >, Nov. 30, 2021, (11 total pages).

\* cited by examiner

METHODS OF 3D CLOTHED HUMAN RECONSTRUCTION AND ANIMATION FROM MONOCULAR IMAGE

CROSS-REFERENCE TO RELATED APPLICATION(S)

This application is based on and claims priority to U.S. Provisional Patent Application No. 63/315,377 filed on Mar. 1, 2022, the disclosure of which is incorporated by reference herein in its entirety.

TECHNICAL FIELD

The disclosure is related to 3D clothed human reconstruction and animation for VR/AR applications such as photo wake-up, etc., and to methods of reconstruction and animation based on one single image.

BACKGROUND

Digital human reconstruction and animation has been explored for immersive applications, such as AR/VR experiences, movies, games etc. Especially, 3D model reconstruction and animation from a single image has attracted a lot of interests due to its simple settings and wide range of scenarios. Usually, creating a 3D content, such as human model, needs sophisticated 3D scanning devices, multi-view stereo algorithms, or tedious capture procedures, where a sensor needs to be moved around. Moreover, the character animation also involves large manual effort to do the rigging and skinning. By leveraging the technologies of computer vision, computer graphic, and machine learning, it is possible to digitize the entire 3D clothed body model and enable to perform the animation automatically from a single image input.

Recent research recovered 3D human models mainly from two folds: one is based on parametric model, and the other is utilizing implicit function-based model. However, each of the two models has its own limitations. Parametric model has accurate pose and shape information and can control the vertices through skinning weights, but it fails to carry rich detailed and textured surfaces. While implicit function-based model reconstructs a more accurate surface with color information, its surface vertices cannot be controlled without pose and shape information.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

This disclosure provides for systems and methods to perform three-dimensional (3D) clothed human reconstruction and animation based on one single image.

According to an aspect of the disclosure, there is provided a method that includes: receiving a two-dimensional (2D) image of a human; segmenting the 2D image into a foreground with the human and a background without the human in the 2D image; generating a parametric model comprising a pose, a shape, and one or more rigging parameters based on the human in the foreground; predicting a textured three-dimensional (3D) model using implicit surface reconstruction of the human in the foreground; aligning the parametric model and the textured 3D model using a 3D registration; and generating a textured 3D clothed human model based on the aligned parametric model and the predicted textured 3D model. The 3D clothed human model may include at least a 3D shape of the human in the 2D image with reconstructed surface textures in a reconstructed 3D space.

According to other aspects of the disclosure, an apparatus and computer readable medium consistent with the method are also provided.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
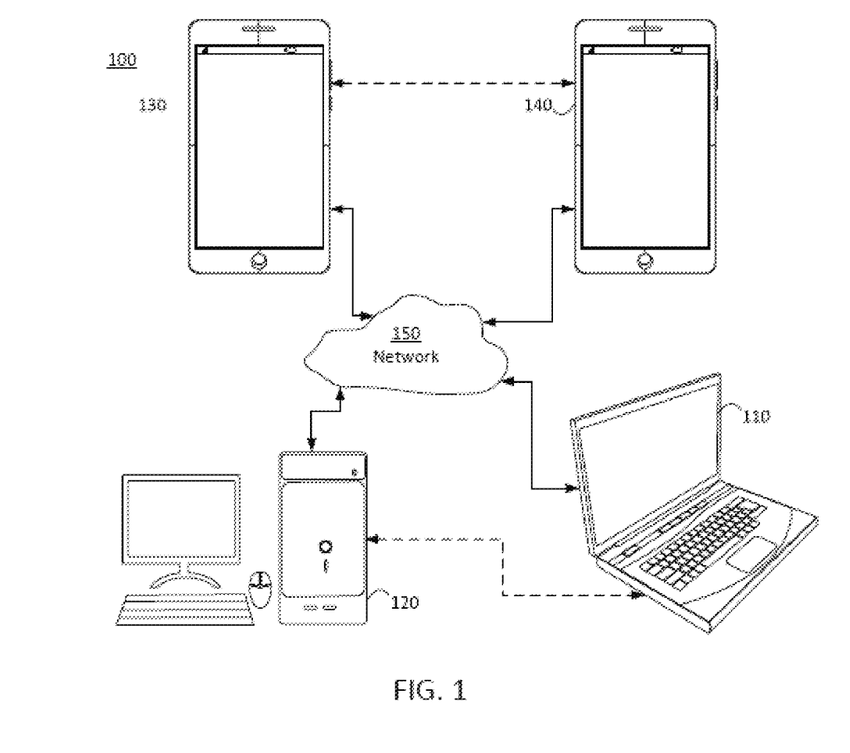
FIG. 1 is a schematic illustration of a simplified block diagram of a communication system, in accordance with embodiments of the present disclosure.
Figure 2:
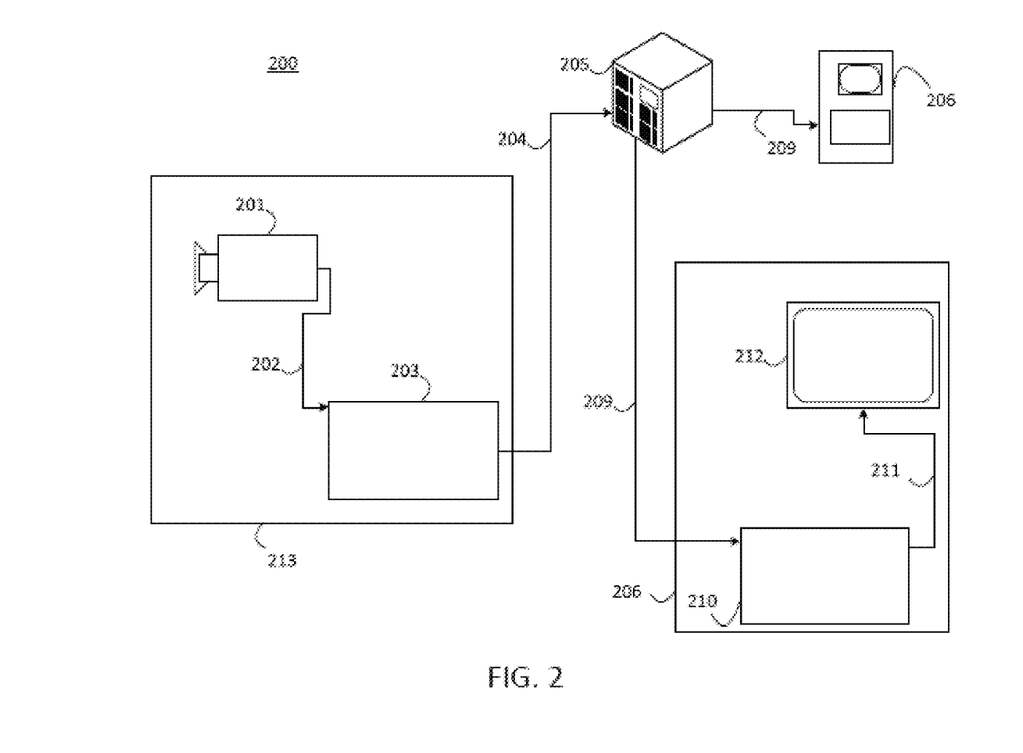
FIG. 2 is a schematic illustration of a simplified block diagram of a streaming system, in accordance with embodiments of the present disclosure.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Figure 3:
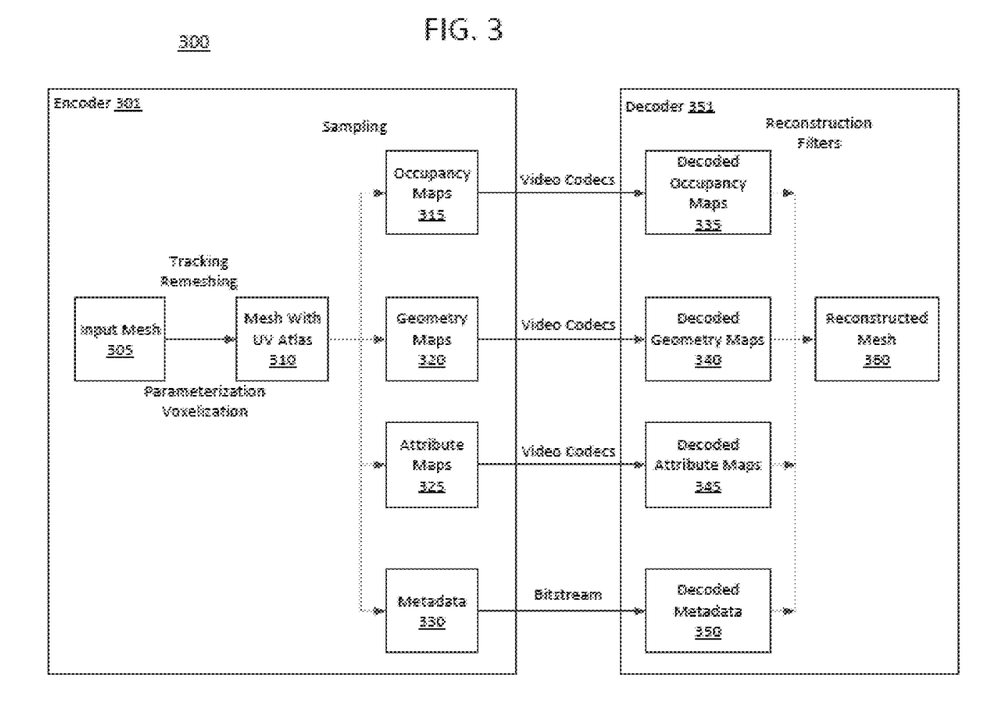
FIG. 3 is a schematic illustration of a simplified block diagram of a video encoder and decoder, in accordance with embodiments of the present disclosure.

FIG. 3 is an exemplary diagram of framework 300 for dynamic mesh compression and mesh reconstruction using encoders and decoders.

As seen in FIG. 3, framework 300 may include an encoder 301 and a decoder 351. The encoder 301 may include one or more input mesh 305, one or more mesh with UV atlas 310, occupancy maps 315, geometry maps 320, attribute maps 325, and metadata 330. The decoder 351 may include decoded occupancy maps 335, decoded geometry maps 340, decoded attribute maps 345, decoded metadata 350, and reconstructed mesh 360.

According to an aspect of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The generated occupancy maps 335, geometry maps 340, and attribute maps 345 may be encoded using appropriate codecs (e.g., HVEC, VVC, AV1, etc.) and transmitted to a decoder. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 315 may use appropriate techniques and methods, in addition to embodiments described herein, to decode the occupancy maps, geometry maps, and attribute maps. In an embodiment, decoder 351 may generate decoded occupancy maps 335, decoded geometry maps 340, decoded attribute maps 345, and decoded metadata 350. The input mesh 305 may be reconstructed into reconstructed mesh 360 based on the decoded occupancy maps 335, decoded geometry maps 340, decoded attribute maps 345, and decoded metadata 350 using one or more reconstruction filters and techniques. In some embodiments, the metadata 330 may be directly transmitted to decoder 351 and the decoder 351 may use the metadata to generate the reconstructed mesh 360 based on the decoded occupancy maps 335, decoded geometry maps 340, and decoded attribute maps 345. Post-filtering techniques, including but not limited to remeshing, parameterization, tracking, voxelization, etc., may also be applied on the reconstructed mesh 360.

Figure 4:
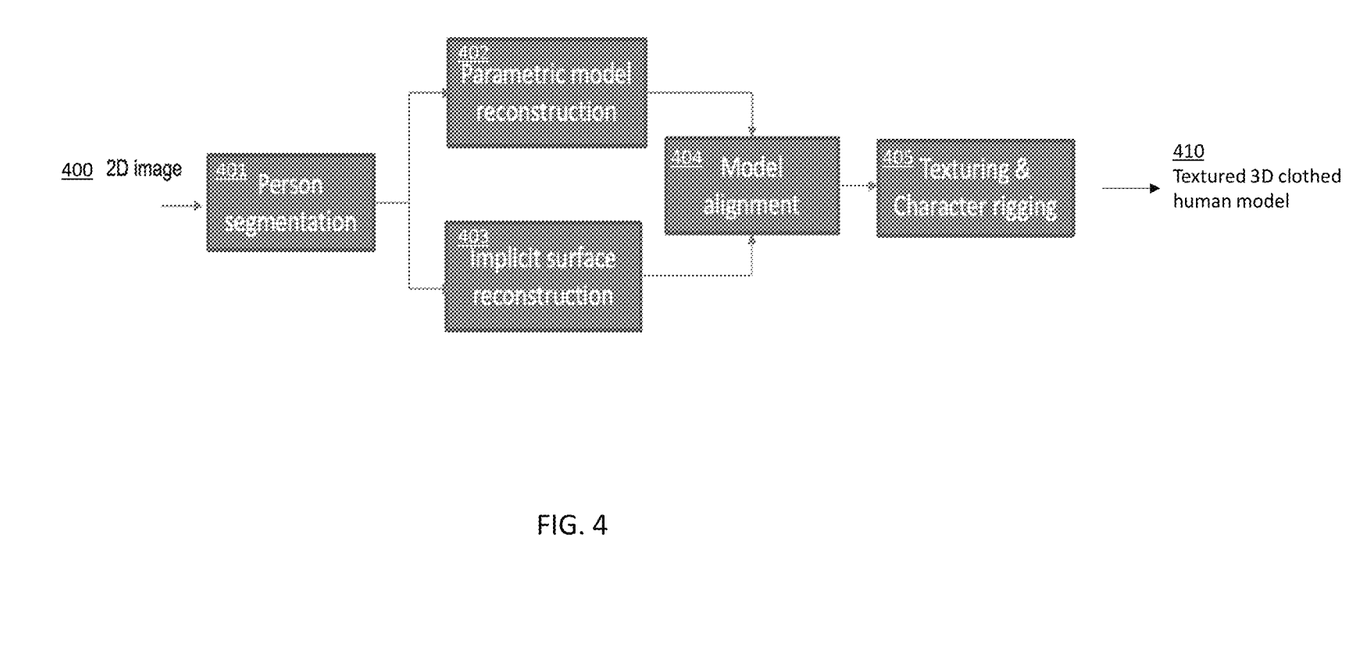
FIG. 4 is a diagram of the pipeline of a 3D clothed human reconstruction and animation, in accordance with embodiments of the present disclosure.

In some embodiments, an effective pipeline of 3D clothed human reconstruction and animation from one single image is presented, as shown in FIG. 4. The essential idea of the disclosure is to take the advantages of parametric model and implicit function model by a proposed high-accuracy 3D registration. More specifically, given a monocular 2D image 400 as input, at operation 401 the foreground with the person is first segmented from the background in. At operation 402 a parametric model is generated with pose, shape and rigging parameters, while at operation 403, a textured 3D model with more details of the surface is created by leveraging the implicit surface reconstruction. Then, at operation 404, the two models are aligned by a 3D registration algorithm. Thanks to the 3D alignment, at operation 405, the texture can be transferred from the implicit function model to the parametric model, while the pose, shape and rigging parameters can be transferred from parametric model to the implicit function model. Each of them can generate a textured 3D clothed human model 410, which can be animated automatically by any off-the-shelf motion capture dataset.

Figure 5:
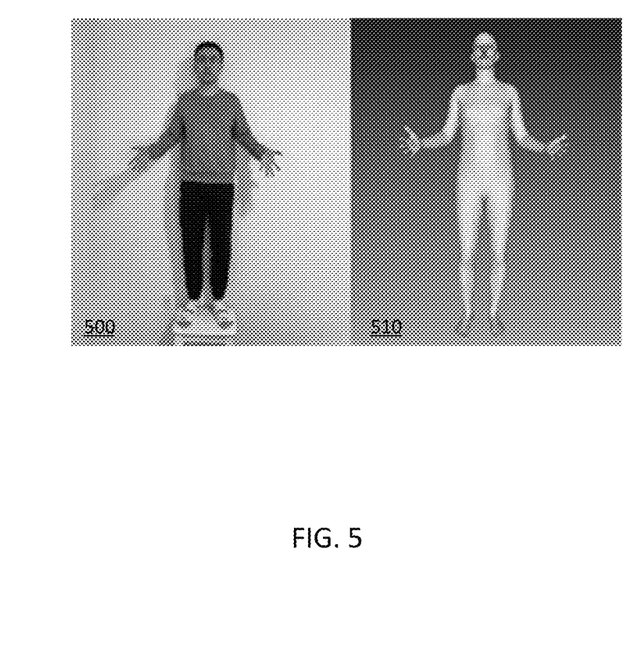
FIG. 5 is an exemplary illustration of a SMPL body model, in accordance with embodiments of the present disclosure.

In some embodiments, a parametric model with pose, shape and rigging parameters can be generated from a single image, as shown in FIG. 5. Most of the statistical human models can be adopted as the parametric model in the pipeline, such as SMPL, SMPL-X, STAR. Here, SMPL model is utilized as an example. FIG. 5 illustrates an example of SMPL body model 510 fit to an input image 500. For SMPL model, the shape parameter $\beta \in R^{10}$ and pose parameter $\theta \in R^{72}$ can be estimated to match the output of the parametric body model with the input of the 2D image. Both the traditional optimization-based methods and the learning-based methods can be adopted. For the optimization-based method, an iterative fitting approach attempts to estimate the body pose and shape that best explains 2D observations, most typically 2D joint locations, silhouette, etc., which is required to extract from the 2D image before the optimization. Since the process explicitly optimizes for the agreement of the model with image features, a good fit is typically achieved, but the optimization tends to be very slow and is quite sensitive to the choice of the initialization. The learning-based methods regress pose and shape directly from the image. Most of these works investigate what is the most reliable modality to regress pose and shape from. Surface landmarks, pose key points and silhouettes, semantic part segmentation, or raw pixels, have all been considered as the network input, and a large amount of data is necessary to properly train the network. Although both optimization-based method and learning-based method have weak and strong points, they can be adopted in the pipeline to generate the parametric model.

Figure 6:
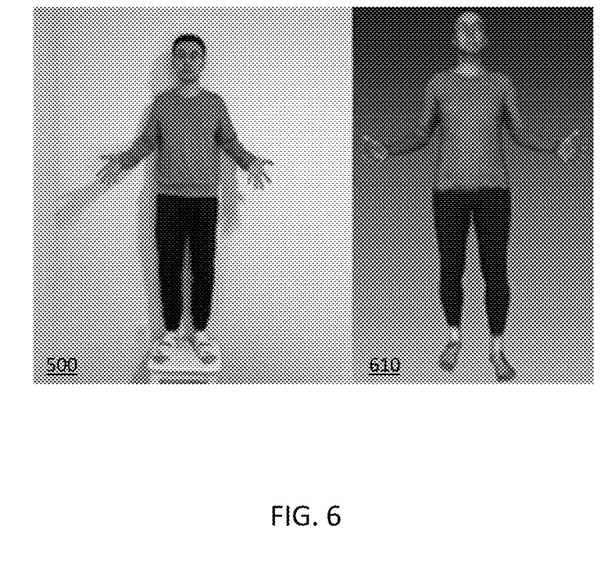
FIG. 6 is an exemplary illustration of an implicit surface reconstruction, in accordance with embodiments of the present disclosure.

In some embodiments, the implicit surface reconstruction method can solve the problem of textured surface inference of clothed 3D human from a single image. FIG. 6 illustrates an example of generating a textured 3D model 610 from the implicit surface reconstruction based on a PIFu scheme from single image 500. Usually, an encoder, such as encoder 301, is trained to learn individual feature vectors for each pixel of an image that takes into account the global context relative to its position. Given this per-pixel feature vector and a specified z-depth along the outgoing camera ray from this pixel, the implicit surface reconstruction method learns an implicit function that can classify whether a 3D point corresponding to this z-depth is inside or outside the surface. In particular, the feature vector spatially aligns the global 3D surface shape to the pixel, which preserves local details present in the input image while inferring plausible ones in unseen regions. The end-to-end and unified digitization approach can directly predict high-resolution 3D shapes of a person with complex hairstyles and wearing arbitrary clothing. By simply adopting the implicit function to regress RGB values at each queried point along the ray, implicit surface reconstruction can be naturally extended to infer per-vertex colors. Hence, the implicit surface reconstruction also generates a complete texture of the surface, while predicting plausible appearance details in unseen regions. As one of the implicit surface reconstruction methods, PIFu is adopted in the pipeline.

The key module in the pipeline is to register the above two models. Similar with the previous sections, the SMPL and PIFu are utilized as the example in the pipeline.

In some embodiments, the minimum 3D bounding boxes that contain all the vertices for each model are detected. Then, the center of the parametric model is aligned to the center of the non-parametric model and scaling is performed to resize the two models as the same. Next, the shape and pose parameters of the parametric model are optimized to minimize the difference between the 3D representation of the two models. The distance field can be used to represent the model in the 3D space. More specifically, the 3D space can be presented as a volumetric cube. The signed distance function (SDF) of each voxel in the volume represents the distance between this voxel and nearest surface. The zero level set of the volume will be the 3D surface of the model. The SDF represents the free space as positive values that increase with distance from the nearest surface, and occupied space with a similarly negative value. To minimize the difference between the distance fields of the two models, the non-linear optimization method is used. The energy function is defined as follows:

$$E(\theta,\beta)=\Sigma_i \Psi(SDF(m_i)-SDF(T(\theta,\beta)_i)) \qquad \text{eqn. (1)}$$

where β is the shape parameter of the SMPL model, θ is the pose parameter of the SMPL model, and is a robust kernel function, such as Huber loss function, to calculate the error. Given the different shape and pose parameters, the generated SMPL body model will be different, and the total SDF kernel loss of all voxels between the SMPL model and the PIFu will be changed. The optimal pose and shape parameter will minimize the energy function:

$$\theta^*, \beta^* = \underset{\theta,\beta}{\operatorname{argmin}} E(\theta, \beta) \qquad \text{eqn. (2)}$$

For this non-linear optimization problem, the optimal θ*, β* can be solved by a Gauss-Newton method or a Levenberg-Marquardt method. Finally, there may still exist mismatch between the naked SMPL model and clothed PIFu model. To minimize the difference between them, a SMPL+D model, Tex2Shape, is utilized as a bridge from PIFu model to SMPL model. The Tex2Shape model outputs a T-pose model and displacement map. SMPL pose is applied to Tex2Shape model to repose it to match the PIFU model. We jointly optimize the per-vertex displacement map D to fit the vertices of PIFu model. The similar optimization problem is solved again to align the Tex2shape model and PIFu model. After a good alignment between Tex2Shape model and PIFu model is achieved, we can transfer the texture from PIFu model to Tex2Shape model.

The texture from the implicit surface reconstruction model can be transferred to the parametric model after model alignment. However, the depth differences of the face regions in implicit surface model are much lower than those of the face region in parametric model. This leads to the artifact of the texturing mapping in the face region. For example, the eyes might be missing or the textures in face region can be blurry. To increase the visual quality of the model, a 2D landmark based alignment approach is proposed.

In some embodiments, the 3D facial landmark positions in the SMPL template are manually annotated based on a pre-selected facial landmark scheme, e.g. the popular 68-point scheme. Usually these landmarks are defined on 2D frontal views, therefore it is better to exclude those landmarks defined along the 2D face contour as they are in general less accurate than those defined in the central region and their corresponding positions in 3D can be hard to locate confidently. After the 3D landmarks are manually annotated, they can be projected to the input 2D image using the camera parameter estimated from the previous step. On the other hand, a 2D face landmark detection algorithm, either off-the-shelf or custom built, can be applied to automatically extract 2D facial landmarks from the input single image. Next, a non-linear parametric warping function, e.g. a thin-plate spline function, can be solved by fitting the correspondences between the automatically extracted facial landmarks and the 2D projection of manually annotated 3D facial landmarks. Then the resulting non-linear warping function is applied to the original RGB image to generate a warped image with desired face texture that is better aligned with the 3D model. Finally, the facial texture is updated from image. As the model registration step provides a high-quality non-face region texture transfer, only the facial texture will be updated by exploiting the target image from the non-linear warping. To select the facial region in parametric model, e.g. SMPL model, the tip of the nose is treat as the reference point, the middle of forehead as the threshold point. Then, all the points with Euclidean distance smaller than or equal to the distance between the reference point and the threshold point are marked as "facial points". These facial points are projected to the target image using camera poses with SMPL model, then the nearest neighbor of each projected facial point provides texture (RGB value divided by 255 to match the texture in PIFu) to the facial vertices in SMPL.

In some embodiments, mesh skinning is a common approach for 3D animation. For the parametric models, the weighted sum of the transform of 3D joints is applied to each vertex based on the rigging parameters, so that the mesh can be animated as the motion sequences. While for the PIFu model animation, the skinning weights are transferred from SMPL to PIFu given the registered models. Specifically, for each vertex in PIFu, the closest vertex in SMPL is searched, and then the weights are transferred from SMPL vertex to PIFu vertex. Then, given the 3D joints sequence, the animation can be performed automatically.

The techniques, described above, can be implemented as computer software using computer-readable instructions and physically stored in one or more computer-readable media. For example, FIG. 7 shows a computer system 700 suitable for implementing certain embodiments of the disclosure.

The computer software can be coded using any suitable machine code or computer language, that may be subject to assembly, compilation, linking, or like mechanisms to create code including instructions that can be executed directly, or through interpretation, microcode execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
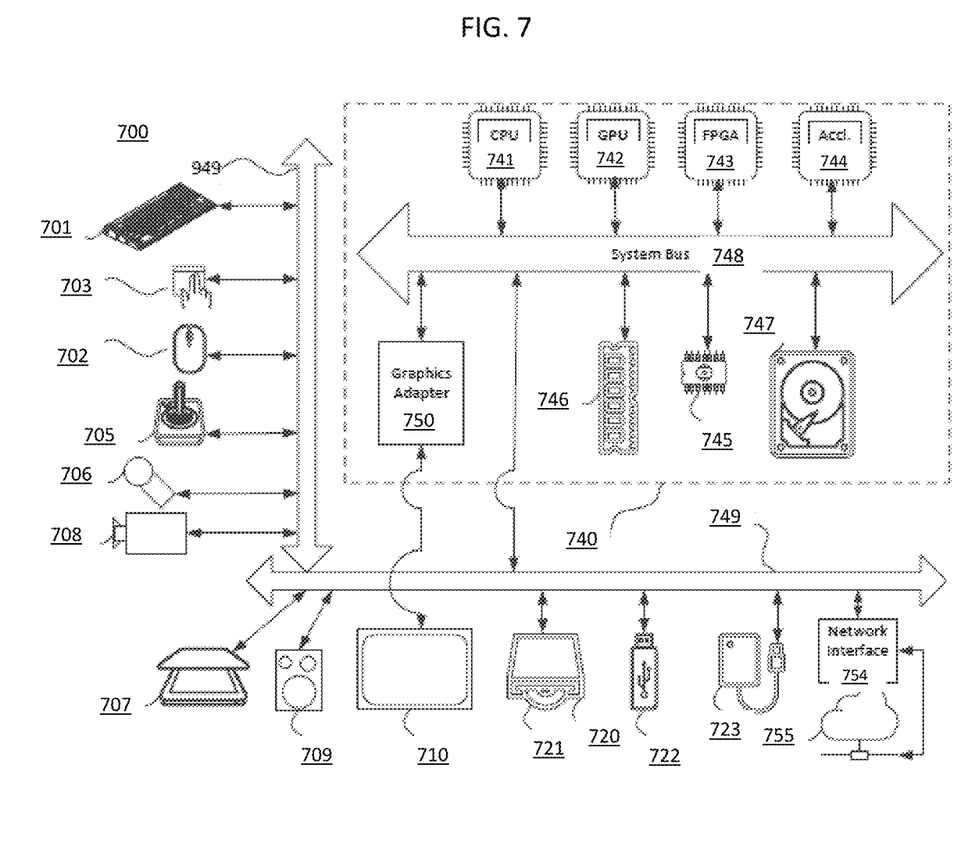
FIG. 7 is a diagram of a computer system suitable for implementing the process, in accordance with embodiments of the present disclosure.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there can also be tactile feedback devices that do not serve as input devices). For example, such devices may be audio output devices (such as: speakers 707, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 747 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 755. Certain protocols and protocol stacks can be used on each of those networks and network interfaces as described above.

Aforementioned human interface devices, human-accessible storage devices, and network interfaces 754 can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 747. Architectures for a peripheral bus include PCI, USB, and the like. A graphics adapter 750 may be included in the core 740.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged.

Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method executed by at least one processor, the method comprising:
   receiving, by a processor, a two-dimensional (2D) image of a human;
   segmenting the 2D image into a foreground with the human and a background without the human in the 2D image;
   generating a parametric model comprising a pose, a shape, and one or more rigging parameters based on the human in the foreground;
   predicting a textured three-dimensional (3D) model using implicit surface reconstruction of the human in the foreground;
   aligning the parametric model and the textured 3D model using a 3D registration, wherein the aligning comprises aligning a center of the parametric model with a center of the textured 3D model based on respective minimum bounding boxes that contain all vertices for the parametric model and the textured 3D model; and
   generating a textured 3D clothed human model based on the aligned parametric model and the predicted textured 3D model, wherein the textured 3D clothed human model comprises at least a 3D shape of the human in the 2D image with reconstructed surface textures in a reconstructed 3D space.

2. The method of claim 1, wherein the aligning further comprises:
   transferring a texture from the textured 3D model to the parametric model; and
   transferring the pose, the shape, and the one or more rigging parameters from the parametric model to the textured 3D model.

3. The method of claim 1, wherein the parametric model is generated to fit the 2D image input.

4. The method of claim 1, wherein the parametric model and textured 3D model are aligned by minimizing a difference of one or more distance fields in 3D space.

5. The method of claim 1, wherein the textured 3D clothed human model is animated by a motion capture dataset.

6. The method of claim 1, wherein the parametric model is based on one of a following statistical human models: a skinned multi-person linear model (SMPL), a skinned multi-person linear model expressive (SMPL-X), or a sparse trained articulated human body regressor (STAR).

7. The method of claim 1, wherein the generating the textured 3D model is based on a pixel-aligned implicit function (PIFu) scheme from the 2D image.

8. An apparatus comprising:
   at least one memory configured to store program code; and
   at least one processor configured to read the program code and operate as instructed by the program code, the program code including:
   receiving code configured to cause the at least one processor to receive, a two-dimensional (2D) image of a human;
   segmenting code configured to cause the at least one processor to segment the 2D image into a foreground with the human and a background without the human in the 2D image;
   first generating code configured to cause the at least one processor to generate a parametric model comprising a pose, a shape, and one or more rigging parameters based on the human in the foreground;
   second generating code configured to cause the at least one processor to predict a textured three-dimensional (3D) model using implicit surface reconstruction of the human in the foreground;
   aligning code configured to cause the at least one processor to align the parametric model and the textured 3D model using a 3D registration,
     wherein the aligning comprises aligning a center of the parametric model with a center of the textured 3D model based on respective minimum bounding boxes that contain all vertices for the parametric model and the textured 3D model; and
   third generating code configured to cause the at least one processor to generate a textured 3D clothed human model based on the parametric model and the predicted textured 3D model, wherein the textured 3D clothed human model comprises at least a 3D shape of the human in the 2D image with reconstructed surface textures in a reconstructed 3D space.

9. The apparatus of claim 8, wherein the aligning code further causes the processor to:
   transfer a texture from the textured 3D model to the parametric model; and
   transfer the pose, shape, and the one or more rigging parameters from the parametric model to the textured 3D model.

10. The apparatus of claim 8, wherein the parametric model is generated to fit the 2D image input.

11. The apparatus of claim 8, wherein the parametric model and textured 3D model are aligned by minimizing a difference of one or more distance fields in 3D space.

12. The apparatus of claim 8, wherein the textured 3D clothed human model is animated by a motion capture dataset.

13. The apparatus of claim 8, wherein the parametric model is based on any one of a following statistical human models: a skinned multi-person linear model (SMPL), a skinned multi-person linear model expressive (SMPL-X), or a sparse trained articulated human body regressor (STAR).

14. The apparatus of claim 8, wherein the textured 3D model is based on a pixel-aligned implicit function (PIFu) scheme from the 2D image.

15. A non-transitory computer readable medium having stored thereon computer code which, when executed by at least one processor, causes the at least one processor to at least:
   receive a two-dimensional (2D) image of a human;
   segment the 2D image into a foreground with the human and a background without the human in the 2D image;
   generate a parametric model comprising a pose, a shape, and one or more rigging parameters based on the human in the foreground;
   predict a textured three-dimensional (3D) model using implicit surface reconstruction of the human in the foreground;
   align the parametric model and the textured 3D model using a 3D registration, wherein the aligning comprises aligning a center of the parametric model with a center of the textured 3D model based on respective minimum bounding boxes that contain all vertices for the parametric model and the textured 3D model; and generate a textured 3D clothed human model based on the aligned parametric model and the predicted textured 3D model, wherein the textured 3D clothed human model comprises at least a 3D shape of the human in the 2D image with reconstructed surface textures in a reconstructed 3D space.

16. The non-transitory computer readable medium according to claim 15, wherein the instructions to cause the at least one processor to align the parametric model and the textured 3D model further cause the processor to:

transfer a texture from the textured 3D model to the parametric model; and transfer the pose, the shape, and the one or more rigging parameters from the parametric model to the textured 3D model.

17. The non-transitory computer readable medium according to claim 15, wherein the parametric model is generated to fit the 2D image input.

18. The non-transitory computer readable medium according to claim 15, wherein the parametric model and textured 3D model are aligned by minimizing a difference of one or more distance fields in 3D space.

19. The non-transitory computer readable medium according to claim 15, wherein the textured 3D clothed human model is animated by a motion capture dataset.

20. The non-transitory computer readable medium according to claim 15, wherein the parametric model is based on any one of a following statistical human models: a skinned multi-person linear model (SMPL), a skinned multi-person linear model eXpressive (SMPL-X), or a sparse trained articulated human body regressor (STAR).

* * * * *